Figure 1:
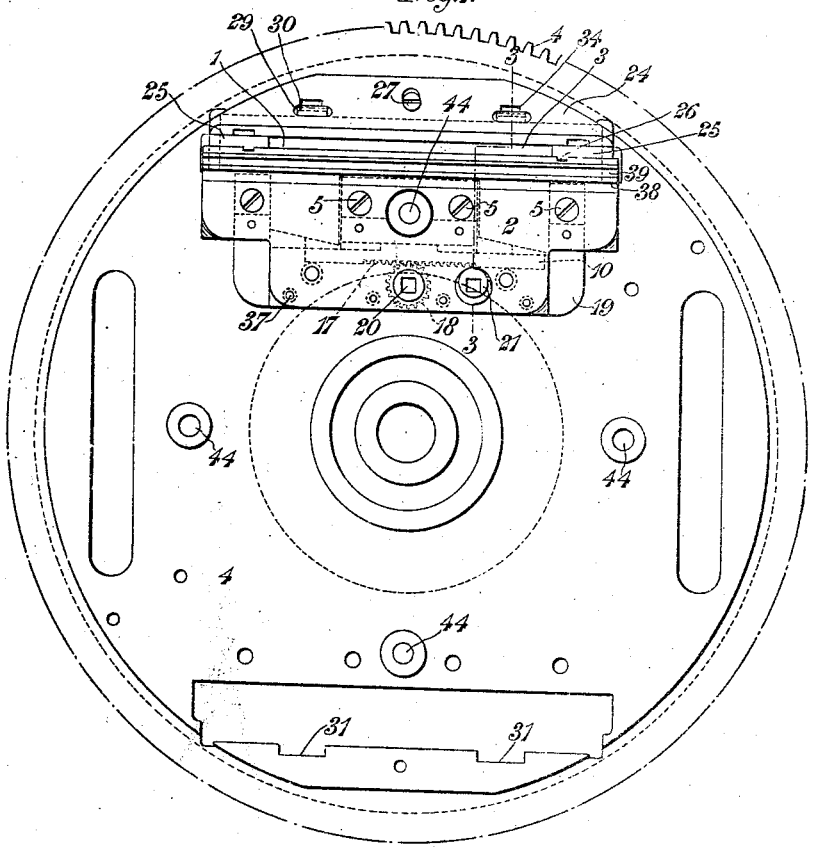

H. PEARCE & J. E. BILLINGTON.
PRODUCTION OF LINOTYPES AND APPARATUS THEREFOR.
APPLICATION FILED OCT. 15, 1908. RENEWED JULY 31, 1914.

1,116,623.

Patented Nov. 10, 1914.
11 SHEETS—SHEET 1.

Witnesses
BC Rust
J. J. McCarthy

Inventors
H. Pearce and J. E. Billington
per Foster Freeman Watson & Cat
Attorneys H. PEARCE & J. E. BILLINGTON.
PRODUCTION OF LINOTYPES AND APPARATUS THEREFOR.
APPLICATION FILED OCT. 15, 1908. RENEWED JULY 31, 1914.
1,116,623.
Patented Nov. 10, 1914.
11 SHEETS—SHEET 2.
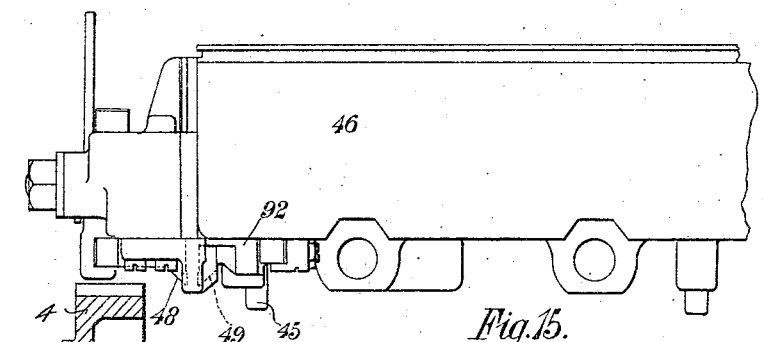
Fig. 15.
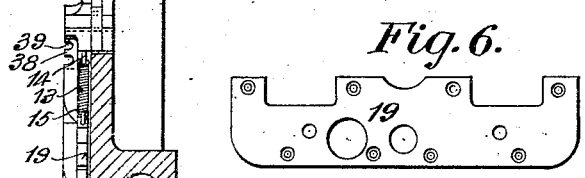
Fig. 6.
Fig. 10.
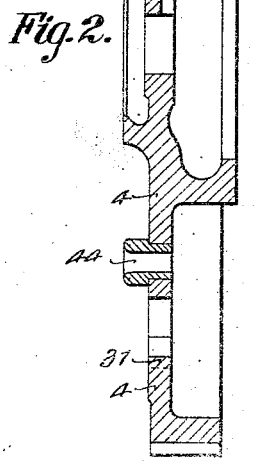
Fig. 2.
Fig. 3.
Witnesses
BC Rust
JJ McCarthy
Inventors
H. Pearce and J. E. Billington
per Foster Freeman Watson & Coit
Attorneys

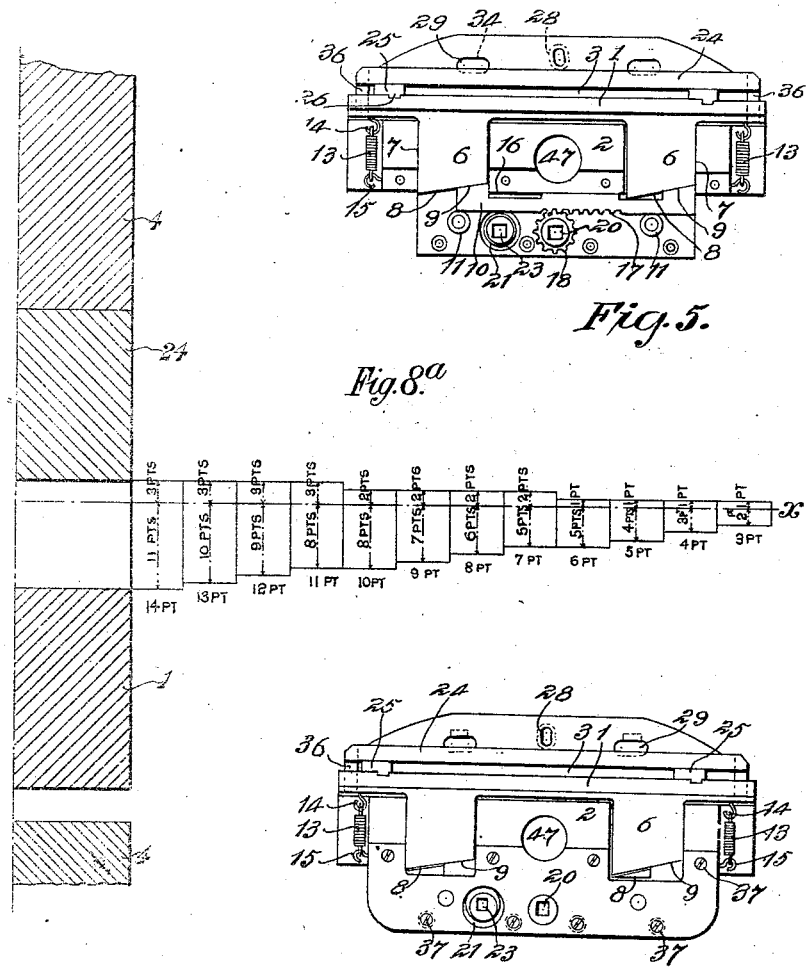

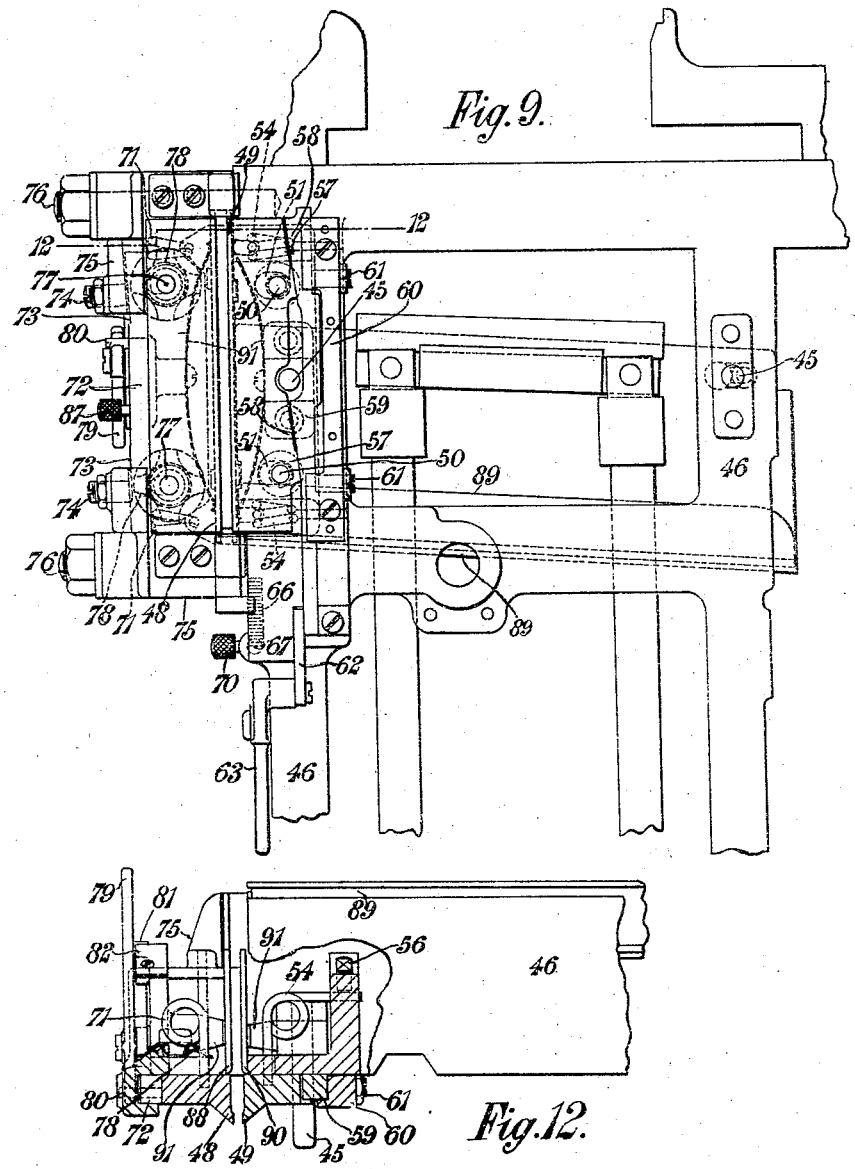

H. PEARCE & J. E. BILLINGTON.
PRODUCTION OF LINOTYPES AND APPARATUS THEREFOR.
APPLICATION FILED OCT. 15, 1908. RENEWED JULY 31, 1914.

1,116,623.

Patented Nov. 10, 1914.
11 SHEETS—SHEET 6.

Witnesses
BC Rust
JJ McCarthy

Inventors
H. Pearce and J. E. Billington
per Porter Freeman Watson &Cit
Attorneys

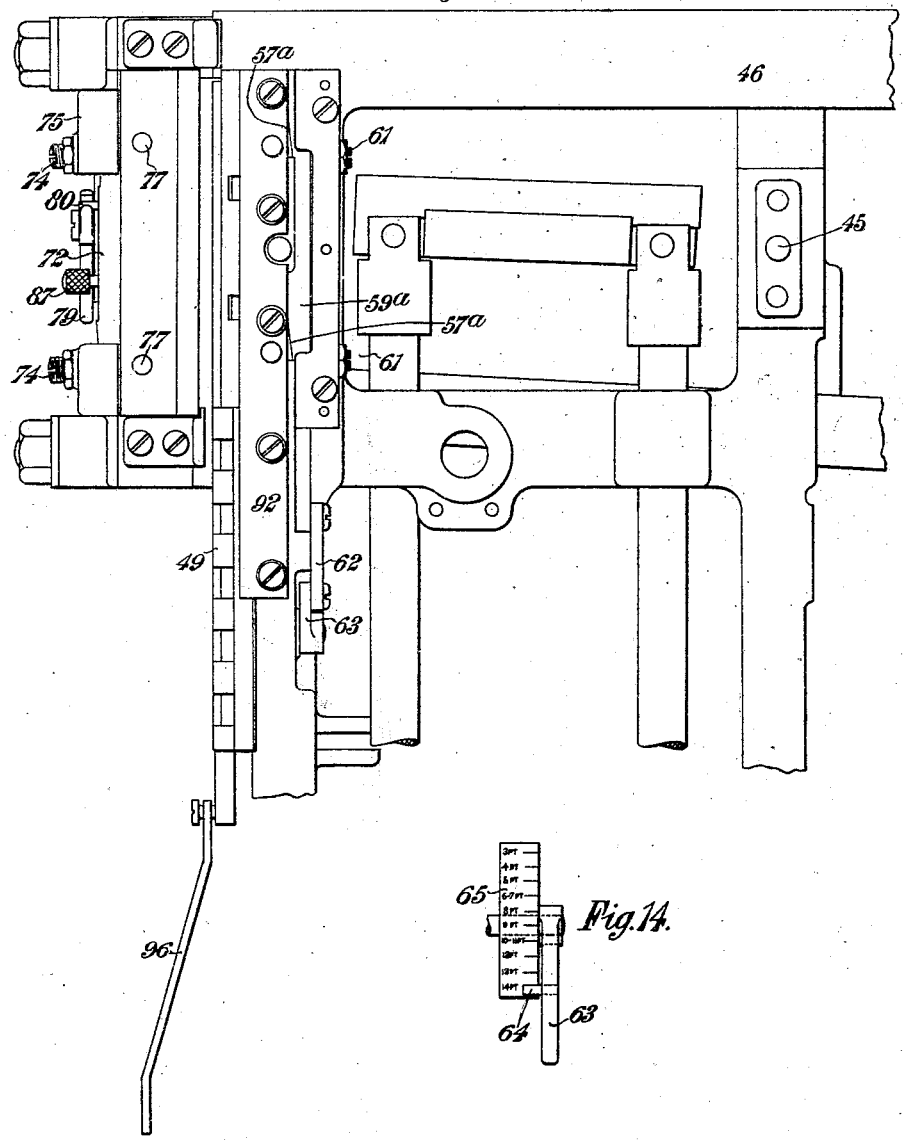

H. PEARCE & J. E. BILLINGTON.
PRODUCTION OF LINOTYPES AND APPARATUS THEREFOR.
APPLICATION FILED OCT. 15, 1908. RENEWED JULY 31, 1914.

1,116,623.

Patented Nov. 10, 1914.
11 SHEETS—SHEET 8.

Witnesses
B C Rust
J J McCarthy

Inventors
H. Pearce and J E Billington
per Foster Freeman Watson & Coit
Attorneys

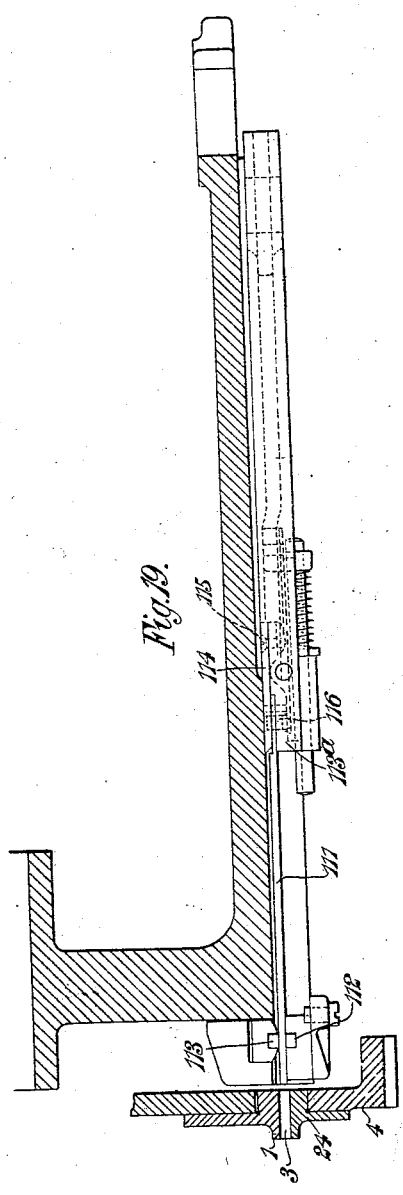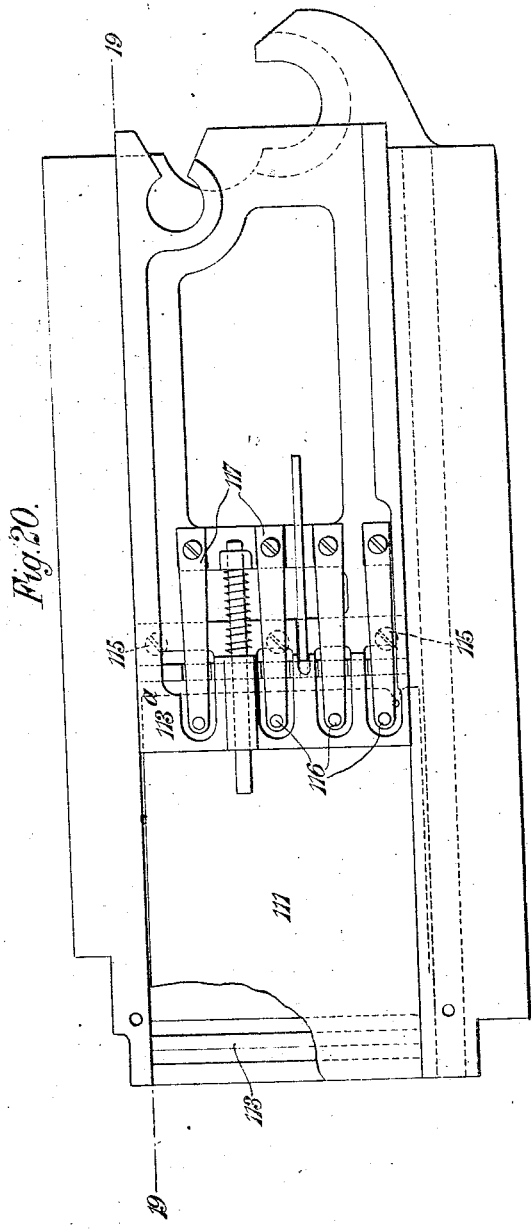

H. PEARCE & J. E. BILLINGTON.
PRODUCTION OF LINOTYPES AND APPARATUS THEREFOR.
APPLICATION FILED OCT. 15, 1908. RENEWED JULY 31, 1914.

1,116,623.

Patented Nov. 10, 1914.
11 SHEETS—SHEET 10.

UNITED STATES PATENT OFFICE.

HERBERT PEARCE AND JOHN ERNEST BILLINGTON, OF BROADHEATH, ENGLAND, ASSIGNORS TO LINOTYPE AND MACHINERY LIMITED, OF LONDON, ENGLAND.

PRODUCTION OF LINOTYPES AND APPARATUS THEREFOR.

1,116,623.   Specification of Letters Patent.   Patented Nov. 10, 1914.

Application filed October 15, 1908, Serial No. 457,912. Renewed July 31, 1914. Serial No. 854,399.

*To all whom it may concern:*

Be it known that we, HERBERT PEARCE and JOHN ERNEST BILLINGTON, subjects of the King of the United Kingdom of Great Britain and Ireland, and both residing at The Linotype and Machinery Works, Broadheath, in the county of Chester, England, have invented new and useful Improvements in the Production of Linotypes and Apparatus Therefor, of which the following is a specification.

In linotype machines as heretofore constructed the characters on the matrices stand in an inverted position, or in other words upside down, when in the casting position. The slotted mold in which the slug is cast against the horizontal line of matrices is mounted on a revolving wheel and the slugs are cast in an inverted position, that is to say with the flat side, which is next to the base of the characters, uppermost. The matrices for all fonts, such as 6 pt., 8 pt., etc., have their characters arranged at a common alining level at the top of the capital or upper case characters. If, therefore, matrices of such different fonts are assembled in one line their characters as reproduced on the slug or linotype will be out of line at the foot or base.

In many classes of printing it is desirable to use in one line characters of different sizes or heights, belonging to different fonts, and to have them stand on a common base line. In order to accomplish this result we depart from the past practice and arrange the characters on the matrices of two or more fonts of different sizes to aline at the base of the capital or upper case letters, so that when such matrices of different sizes are composed in one line and presented to the mold they will produce their characters on the slug or linotype with a common basal alinement. In order to permit the use of such matrices and at the same time permit variation in the thickness of the slugs according to the size of the characters in use, we construct the slotted mold in such manner that the side which lies next to the top of the matrix characters may be adjusted inward and outward toward and from the center of the carrying wheel in order to vary the transverse width of the slot. We also arrange the left-hand trimming knife which dresses the side of the slug next to the head or top of the characters so that it may be adjusted to receive the thickness of the slug required.

Among modern developments in the art of linotype production an attempt has been made to provide for basal alinement of characters or letters of diverse depths or sizes, such for example, as 6, 8 and 10 pt. characters, on a linotype, and this was proposed to be effected by making the cap of the mold a fixture, whereas before it has been adjustable, and instead of the mold bottom being a fixture, as usual, the distance of its molding face from the molding face of the cap was rendered variable by providing interchangeable body plates, each plate being of different thickness, together with complementary liners for fitting the various mold-widths thus produced. In connection with this arrangement of mold it was provided for the left hand knife of the trimming mechanism to be adjustable toward and from the right hand knife instead of vice versa as was usual previously.

Now in place of interchangeable mold body plates, this invention provides adjusting mechanism for operating the mold body in order to permit basal alinement of the characters of diverse sizes on a linotype. Thus no time is lost in varying such a mold as the mold wall is quickly adjusted by the mechanism to its desired new position. To prevent accidental movement, this invention provides a lock acting on, say, a cam bar which is employed in one construction for adjusting the lower mold wall.

The descenders of the respective fonts vary in length or depth according to the body size of the characters of the said fonts or in other words the length of the descending portions below the "m" base varies with each font. To accurately preserve the proportion of every descender to its particular font, would necessitate the adjustment of the respective parts, in both directions relatively to the center of the mold wheel, for every change of font, and although our improved devices may be constructed so as to provide for such adjustments yet we do not consider such a multiplicity of adjustments desirable as the descenders of successive fonts vary only to the extent of one or two thousandths of an inch. That being the case we prefer to deal with the several fonts—so far as regards the adjustments necessary for their respective descenders—as grouped together, allowing the same descender adjustment for all bodies of from say 3 to 6 point, from say 7 to 10 point, and from say 11 to 14 point respectively. In a machine designed for the three last mentioned descender adjustments, only two adjustments of the respective parts of the mold and trimming devices in an outward direction, are required, these being necessary only when, after producing one of the four bodies included in one base group, it is desired to produce a body included in one of the other two base groups; these adjustments for variations of length of descenders are effected in substantially the ordinary way and differ from the existing practice only in so far as they are required at two specific changes of body size and not, as heretofore, at every change of body size.

This invention further provides novel mechanism for adjusting the left hand knife toward and from the right hand knife to correspond with the mold bottom adjustments, or, in the case of the mold cap being adjustable also, the invention provides such a mechanism for each knife. In order to adapt the device for dealing with two-line letters, the left hand knife may be longitudinally movable in known manner, or both knives may be longitudinally movable, and a special mechanism will be described for enabling a knife to be longitudinally movable or immovable at will. Further features of the knife adjustment comprise:— a laterally adjustable cam bar for adjusting the corresponding knife; a particular arrangement of springs for operating the knife against the action of the cam bar; a particular arrangement of locking device for the knife adjustment; and other subsidiary or accessory devices for contributing to the efficient and accurate working of the apparatus.

The invention will now be described by reference to the accompanying drawings which are to be taken as part of this specification and read therewith.

Figure 7:
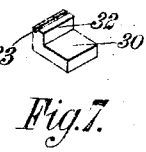
Figure 8:
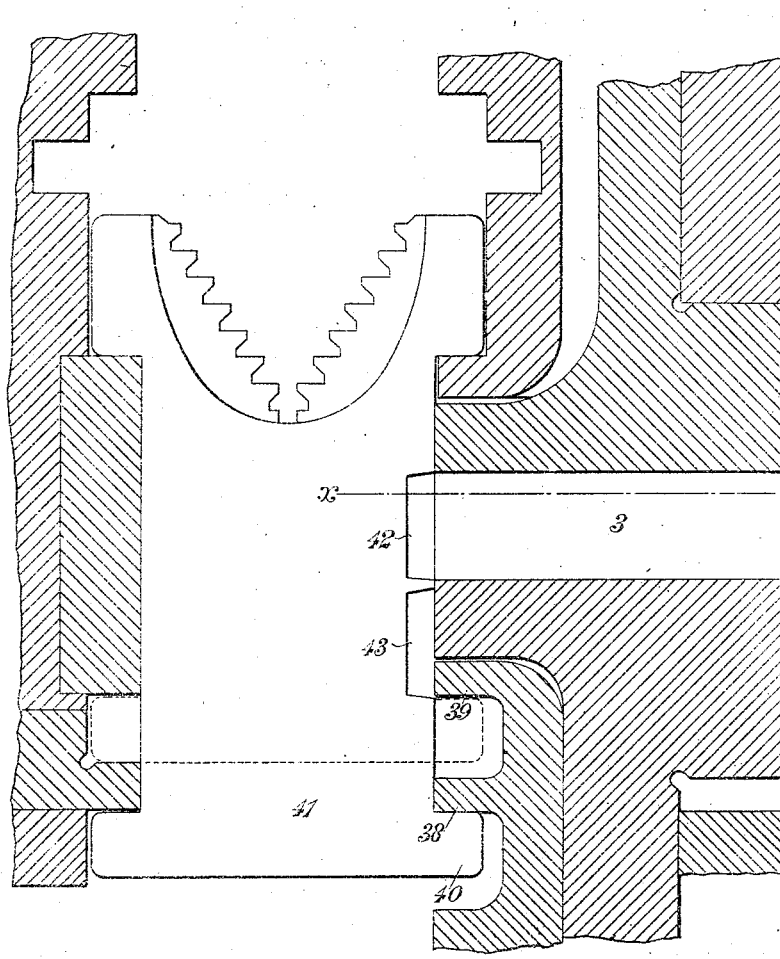
Figures 11, 17:
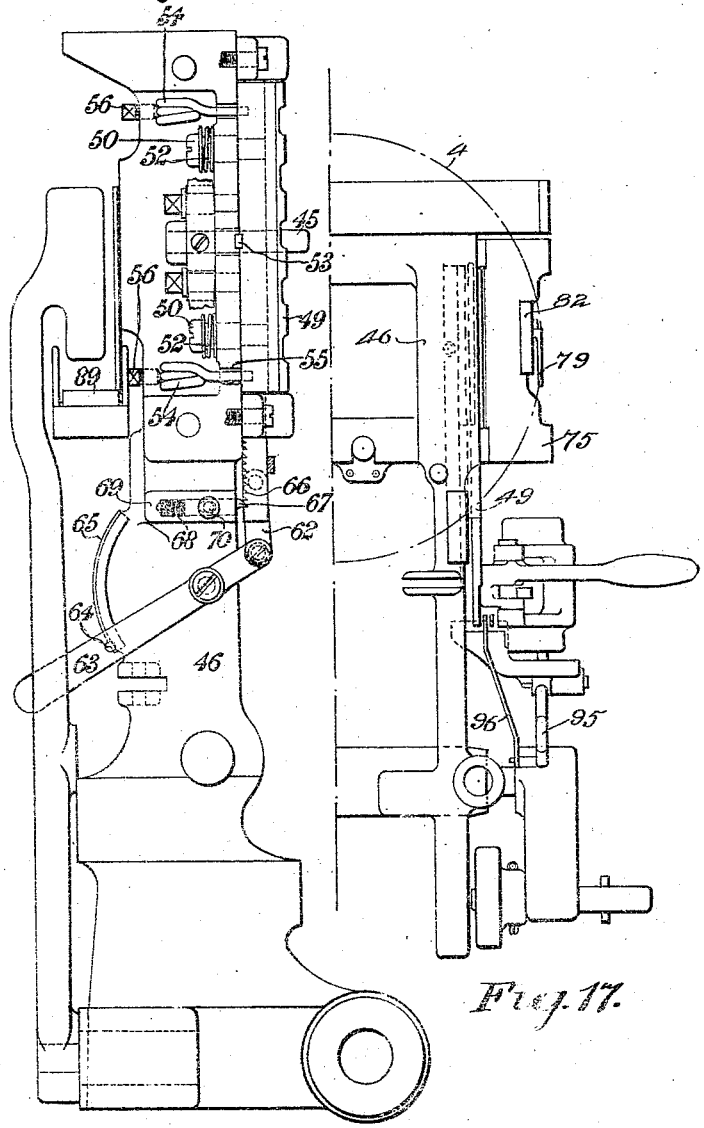
Figure 16:
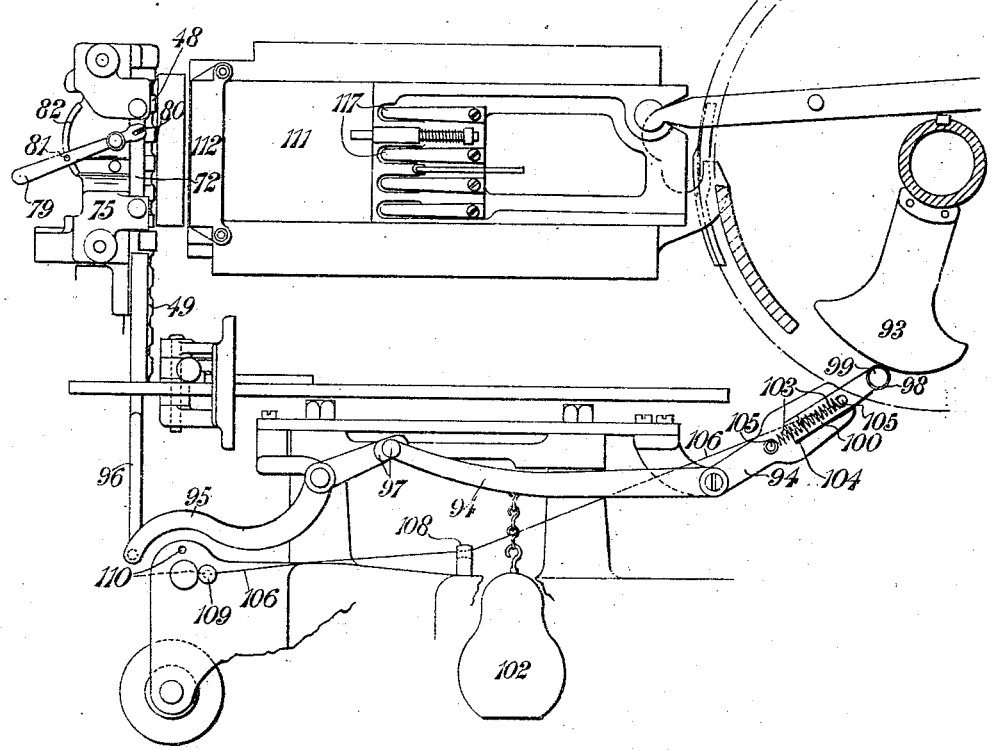
Figure 18:
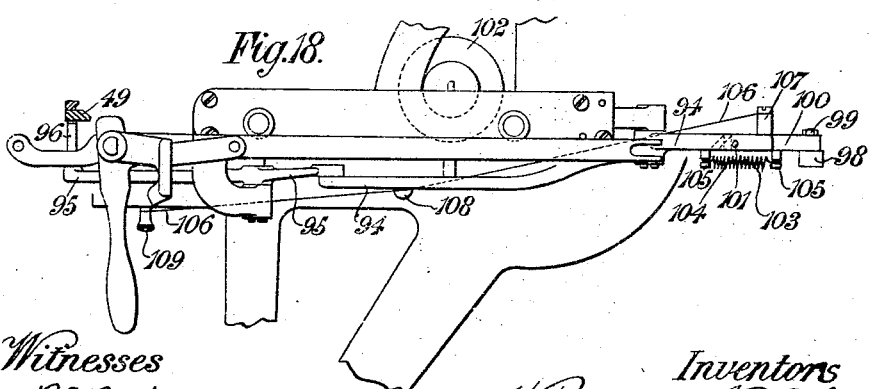
Figure 21:
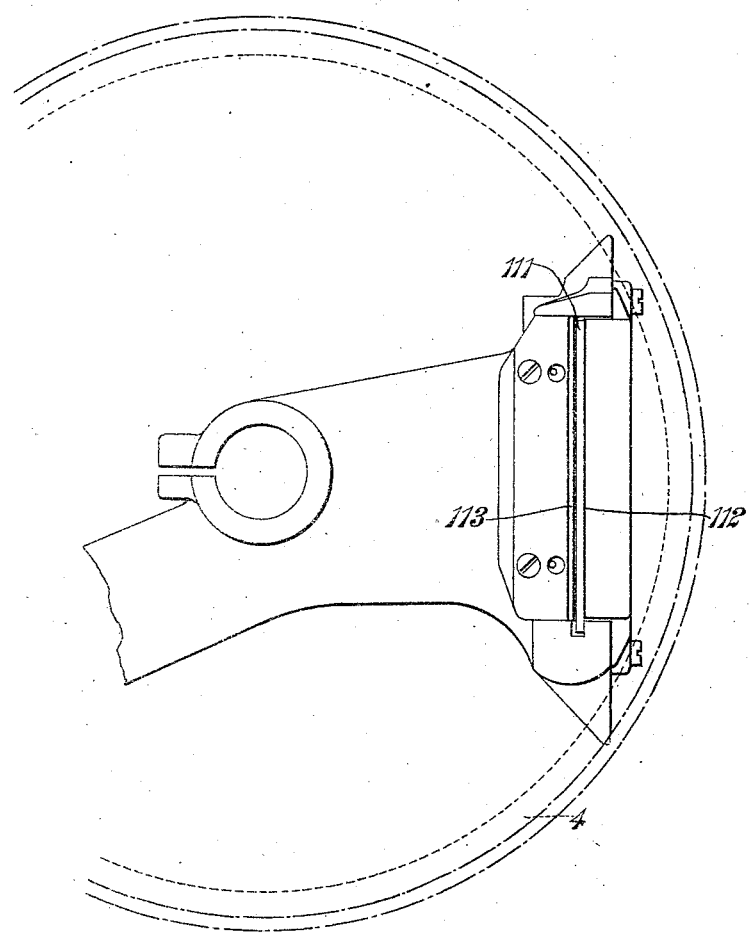
Figure 23:
Figure 24:
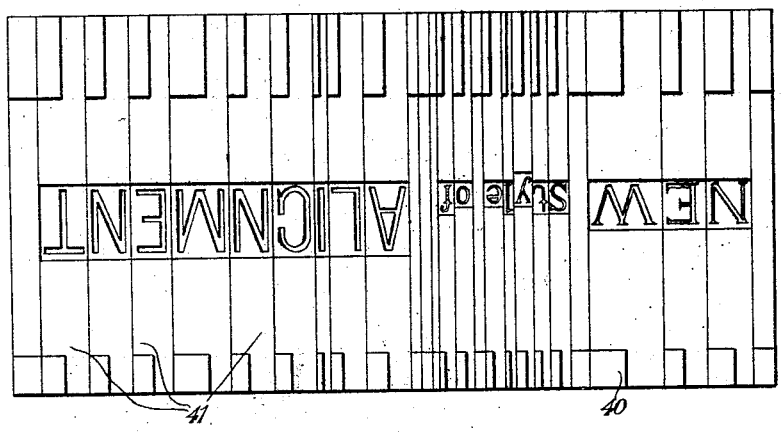
Figure 25:

In these drawings: Figure 1 is a front elevation showing one form of the improved mold attached to a mold wheel which latter is adapted to accommodate two such molds; Fig. 2 is a view representing the mold in end elevation as seen from the right of Fig. 1, and the mold wheel in central vertical section; Fig. 3 is a vertical section on the line 3—3 of Fig. 1, looking toward the left of that figure; Fig. 4 is a rear elevation of the mold detached from the mold wheel; Fig. 5 is a view similar to Fig. 4 but showing the mold with the keeper plate removed; Fig. 6 is an elevation of the said removed keeper plate; Fig. 7 is a perspective view of one of the so-called "base liners"; Fig. 8 is the left-hand portion and Fig. 8ª the right-hand portion of an enlarged sectional view showing in diagram one example of the preferred arrangement of grouping of characters of different sizes alined at the foot or base according to this invention; Fig. 9 is a rear elevation of the trimming knives and other adjacent parts of the machine; Fig. 10 is a left-hand side elevation of part of Fig. 9; Fig. 11 is an elevation as seen from the left-hand side of Fig. 9, but with certain parts omitted and other parts added; Fig. 12 is a view partly in plan and partly in horizontal section on the line 12—12 of Fig. 9; Fig. 13 is a rear elevation generally similar to Fig. 9, but with the left-hand trimming knife longitudinally adjustable for avoiding overhanging two-line letters; Fig. 14 is a front view of a detached portion of the apparatus shown in Fig. 13; Fig. 15 is a plan of Fig. 13; Fig. 16 is a cross-sectional view of the linotype machine drawn to a reduced scale and showing the apparatus represented in Figs. 13, 14 and 15 plus the mechanism for operating same; Fig. 17 is an elevation of the left-hand end of Fig. 16; Fig. 18 is a plan of the lower part of Fig. 16 with the longitudinally adjustable knife in transverse section; Fig. 19 is a horizontal section taken about on the line 19—19 of Fig. 20, of part of the ejector mechanism, and a portion of the mold wheel; Fig. 20 is an elevation of Fig. 19 partly broken away and with certain parts removed; Fig. 21 is a front elevation of part of the ejector mechanism, with part of the mold wheel represented in dotted lines; Fig. 22 is a rear elevation of an assembled line of matrices bearing faces of widely differing depth, and alined at the top in the manner hitherto provided for; Fig. 23 is a front elevation of a linotype cast from the matrices arranged as in Fig. 22; Fig. 24 is a rear elevation of an assembled line of matrices bearing faces of widely differing depth, and alined at the foot or base in the manner provided for by the present invention, and Fig. 25 is a front elevation of a linotype cast from the matrices arranged as in Fig. 24.

In the improved mold constructed according to the present invention and as shown best in Figs. 1, 2, 3 and 4, the face 1 of the mold body 2, or, in other words, that portion of the mold body, which constitutes the bottom of the mold slot 3, is adjustable nearer to and farther from the center of the mold carrier or wheel 4, and the mold body proper—which is rigidly attached to the mold wheel, as ordinarily—is provided with suitable means for guiding the movable portion, or mold bottom, as it is hereinafter called, during such adjustment. In the example illustrated in the drawings, the mold body 2 is secured to the mold wheel 4 by four screws 5 the heads of which are countersunk into the front face of the mold body, and the threaded stems of which are screwed into the mold wheel as shown in dotted lines in Fig. 3.

In the preferred construction, which is that illustrated in Figs. 1 to 7, both inclusive, the mold bottom 1 is provided with two downwardly extending lugs 6 guided between suitable surfaces 7 on the mold body 2, and terminating at their lower ends in inclined surfaces or cams 8 adapted to bear on correspondingly-inclined surfaces or cams 9 on a bar 10 which is capable of sliding longitudinally on suitable guides or rollers 11 in or on the mold body. The longitudinally sliding bar 10 is hereinafter referred to as a cam bar, and, according as it is moved in one or other direction, so will the mold bottom 1 (through the coöperating inclined cams 8, 9) be raised or lowered. It is preferred to provide springs 13 for maintaining the cams 8 in constant operative contact with the cams 9, the said springs at their respectively opposite ends being connected to hooks 14 extending downward from the ends of the mold bottom 1, and to hooks 15 fast in the mold body 2; the springs 13 are not however indispensable to the satisfactory working of the apparatus and they may be dispensed with, and the object for which they are provided may be fulfilled by hand.

The cam bar 10 is held down upon the rollers 11 by a ledge or shoulder 16 (see particularly Fig. 3) on the mold body 2, with which shoulder the upper edge of the said bar is in sliding contact. The cam bar 10 may be moved longitudinally by means of a toothed rack 17 formed on its underside (see Figs. 1 and 5) and engaging with a pinion 18 journaled at its front in the mold body 2, and at its back in the keeper plate 19. The pinion 18 is capable of being rotated by means of a key insertible into the square hole 20 formed axially through it.

To lock the cam bar 10 in any of its various positions of adjustment there is provided an eccentric 21 supported at the rear by its screw-threaded concentric boss 22, Fig. 3, which is rotatable in a correspondingly threaded hole in the mold wheel 4, the said rotation being imparted by the operator, by means of a key insertible in the square hole 23 extending through the eccentric 21 and boss 22. The front portion of the eccentric 21, although not so shown, may be concentrically journaled in the mold body 2, and it will be seen that when the said eccentric occupies its lowest position, it has no effect upon the cam bar 10, and that, when it occupies its highest position, as shown in Figs. 1, 3, 4 and 5, it securely clamps the said cam bar in position, and thereby also serves to rigidly support the mold bottom 1 in the particular position determined by the position of the cam bar 10.

Between the mold bottom 1 and the mold cap 24 are fitted end or "body" liners 25 of practically the usual construction, their thickness corresponding with the body dimension which it is desired shall be given to the linotypes cast in the mold slot 3. These "body" liners 25 are provided with the usual ribs 26 adapted to fit into grooves in the mold bottom 1, to insure their proper position therein, and they are also provided with recesses or otherwise formed for receiving the hereinafter described upstanding guides 36.

Instead of securing the mold cap 24 directly to the mold body 2, as has hitherto generally been the practice, the said cap, according to the present invention, is secured to the mold wheel 4 by a screw 27 the stem of which passes through a slot 28, Figs. 4 and 5, in the mold-cap flange, and screws into the mold wheel, the head of such screw preferably being accommodated in an elongated recess in the said flange, as shown in Fig. 1, so that it may not project beyond the front face of the latter. After the screw 27 has been loosened, the mold cap 24 may be adjusted nearer to or farther from the center of the mold wheel 4, to suit any new base line which may be required, the said mold cap being afterward secured in position by tightening the screw 27. The mold cap 24 is provided with openings 29 extending through its flange and adapted to receive liners 30 hereinafter termed "base liners," which also penetrate into openings or recesses 31, Fig. 1, in the mold wheel 4, for determining the position of the mold cap relatively to the said wheel, and therefore also relatively to the mold bottom 1.

By reference to Fig. 7 it will be seen that the base liners 30 are thicker at their front part, where they fit into the openings 29, than they are at their rear part, where they fit into the recesses 31, the thicker portions forming heads by which the said liners may readily be withdrawn and replaced, and whose rear faces 32, by abutting against the front face of the mold wheel 4, as shown in Fig. 2, determine the proper fore-and-aft position of the said base liners. The upper surface of the head of each of the base liners 30, is formed with a groove or nick 33 for enabling it to be engaged by a screw-driver or equivalent tool for levering it out of its effective position, the front portion of each opening 29 being chamfered off as at 34 for allowing the end of the tool to be inserted and engaged with the nick 33. By reference to Fig. 3 it will be seen that it is the thickness of the base liners 30, that is to say of those parts thereof which are interposed and jammed between the surface 35 of the mold cap 24 and the inwardly-presented surface of the recesses 31, Fig. 1, which determines the operative position of the said mold cap, and that the thicker the base liners employed, the nearer the mold cap will be to the center of the mold wheel 4 and consequently (as the linotypes are cast with the characters inverted) the less will be the allowance for the descenders below the "m" base of such characters.

The mold bottom 1, is provided with upstanding guides 36 whereon the mold cap 24 is slidable, the said mold cap being provided with end recesses engaging with those guides for constantly insuring proper registration between the mold cap and body; these guides 36 may also serve as stops for determining the fore-and-aft position of the before described body liners 25.

The before-mentioned keeper plate 19 is secured to the mold body 2 by countersunk headed screws 37, and serves to retain the cam bar 10 and pinion 18 in position when the mold is detached from the mold wheel 4.

The mold body 2 is provided with the usual alining ledges 38, 39, against one or other of which the rearmost bottom lugs 40 of the matrices 41, Fig. 8, are forced, as ordinarily, during the casting operation. The ledges, through their engagement with the matrix ears, determine the vertical and longitudinal adjustment of the matrices across the mold slot, and thus determine the location of the type characters on the edge of the slug between its side faces. These alining ledges 38, 39 are duplicated for the reason that each of the matrices 41 is provided with two formative cavities 42, 43, of respectively different faces or fonts, which may be alternatively brought into use, as is already well-known in the art, according to the particular face required to be produced on the linotypes.

The mold wheel 4, shown in Figs. 1 and 2, is provided with accommodation for two of the before described adjustable molds, at diametrically opposite parts thereof and it is also provided with four sockets 44 whereof the two which, at the time of the actual casting of the linotypes, are in the same horizontal plane, are adapted to receive pins 45, Figs. 9, 11, 12, 16 and 18, fast on the vise frame 46, for insuring the proper registration of the assembled line of matrices 41 and mold slot 3. By reference to Fig. 1, it will be seen that one of the sockets 44, extends through the mold body 2, beneath the adjustable mold bottom 1, the said mold body, as shown best in Figs. 4 and 5, being provided with an aperture 47 for receiving the said socket. It will be obvious that, if desired the just described arrangement of coöperating sockets and pins may be reversed, that is to say the sockets 44 may be provided on the vise frame 46 and the pins 45 may be provided on the mold wheel 4.

Referring now to Fig. 8ª, the before mentioned system of grouping or alining the matrix characters of different sizes on a common base line is shown applied to a range of bodies varying in dimension from 3 point to 14 point as represented by the indications adjacent to those respective bodies; the line x—x is that which is arbitrarily selected as representative of a given base line; in the case illustrated, it is the standard Roman "m" base. It will be seen that, so far as regards the four bodies of from 3 to 6 point (both inclusive) there is no variation in the accommodation allowed for the respective descenders, one point being the uniform descender allowance throughout those bodies, the gradual increase of these four bodies being upward from the "m" base so far as the actual type faces are concerned, and downward from the base line x—x so far as regards the actual casting of the linotypes. Similarly with the four bodies ranging from 7 point to 10 point, there is a uniformity of descender allowance (in this case two points) and a gradual increase or expansion relatively to the base line x—x, and with the four bodies ranging from 8 point to 11 point there is a uniformity of descender allowance (in this case three points) and a gradual increase or expansion relatively to the base line x—x.

From the foregoing it will be seen that as the descenders are grouped together in only three groups, it will be necessary to adjust the mold cap 24 only when, after producing linotypes included in one group, say the 3 to 6 point group, it is desired to produce linotypes included in say either the 7 to 10, or the 11 to 14 point group. As each of the various body dimensions throughout the range shown in Fig. 8ª, differs from its immediately preceding or succeeding neighbor, to the extent of only one point, it is to be noted that when any change which it is desired to make, involves a change in either direction between 6 and 7 point, or 10 and 11 point then the one point adjustment which must necessarily be given to the mold cap 24 fulfils all requirements, when, however, it is desired to change from a body included in one group to another body differing to the extent of two or more points and contained in another of the groups, then it will be necessary to adjust both the mold cap 24 and the mold bottom 1; these just mentioned facts are to be borne in mind in view of the adjustments, hereinafter fully explained, which must also be given to the trimming knives.

Assuming, as a matter of convenience, that the mold had been last employed for casting linotypes of say 23 ems long and 14 point body. (body liners 25, and base liners 30, Fig. 7, suitable for the 11 to 14 point group having been used for such purpose) and that it is desired to adjust the mold for casting linotypes of the same length but of say 12 point body size, the operator first turns the eccentric 21 to release the cam bar 10 and then, through the rack 17 and pinion 18 moves the cam bar 10 toward the left of the machine so as to allow the mold bottom 1 to be drawn by the springs 13 nearer to the center of the mold wheel 4. The operator then successively removes the 14 point body liners 25 and substitutes for them 12 point body liners 25, moves the cam bar 10 rightward as far as it will go, so as to force the mold bottom 1 outward against the said substituted liners, and then turns the eccentric 21, so as to lock the cam bar 10 in position. The machine is then ready for casting the 12 point body linotypes, the base liners 30 not having been disturbed, because those then in position apply to the group (see Fig. 8ᵃ) which embraces both the 14 and the 12 point body sizes. When the desired change is such as to call for another base, such for example as a change from say the 14 point body size, above exemplified, to a 5 point body size, the operator removes the 14 point body liners 25, as before explained, and substitutes for them 5 point body liners. He next releases the 11 to 14 point base liners 30 then *in situ*, by loosening the screw 27, removes those liners, and substitutes therefor the base liners which appertain to the 3 to 6 point group, after which, by means of the pinion 18, rack 17, and cam bar 10, he forces upward or outward the mold bottom 1, body liners 25 and mold cap 24, until stopped by the base liners 30 being jammed between the respective opposing surfaces of the mold cap 24 and mold wheel 4, this operation serving to secure the said base liners as also the body liners 25 in position. The operator then again tightens the screw 27 to complete the adjustment and thereby renders the mold ready for casting linotypes of the required 5 point body size.

With reference now, to Figs. 9, 10, 11 and 12, which show an improved arrangement of trimming mechanism, it will be seen that the vise frame 46 is of substantially ordinary construction, the only appreciable differences being such as are necessary owing to the left-hand knife 49 being adjustable; as Fig. 9 is a rear elevation, the left-hand knife 49 there appears to the right of the companion knife 48, and vice versa. The left-hand knife 49 is held to the vise frame 46 by two bolts or screws 50 which pass through slots 51 in the vise frame, as shown in dotted lines in Fig. 9, and are encircled by springs 52, Fig. 11, which hold the said knife yieldingly against the rear face of the vise frame. This knife 49 is free to slide horizontally nearer to and farther from the right hand knife 48 and is guided in that direction by a key 53, Fig. 11, two coiled springs 54 always tending to move the said knife 49 away from its companion knife 48. Each of the springs 54 has its two ends projecting at right angles to one another, one of such ends extending rearward through a slot or recess 55, see particularly Fig. 11, and engaging in a hole in the knife 49, the other end being secured in a hole in the vise frame 46, by means of a pinching screw 56. At its left-hand side, the knife 49 is provided with two inclined cams 57, Fig. 9, which, by the springs 54, are constantly held in contact with two inclined cams 58, formed on a bar 59, hereinafter referred to as the cam bar 59 capable of being moved longitudinally between the back of the vise frame 46, and a guide 60 secured to the said vise frame. The guide 60 is provided with two studs 61 adjustable therein, adapted to bear against the back of the cam bar 59, and which, by adjustment, cause the knife 49 to occupy different lateral positions relatively to given vertical positions of the cam bar 59, and which also admit of proper parallelism of the two knives being secured.

To the lower end of the cam bar 59 there is connected, through a link 62, a hand lever 63, pivoted to the vise frame 46 and having its forwardly projecting end situated convenient to the hand of the operator as shown best in Fig. 11. The hand lever 63 is provided with an index or pointer 64, Figs. 11 and 14, adapted to travel over a plate 65 bearing indications such as shown in Fig. 14, which indicates the positions to which the lever 63 must be moved, in order to adjust the knife 49 to correspond with the respective adjustment of the before-described mold bottom 1 in respect of the production of linotypes of different body size.

The cam bar 59 is provided with, or operatively connected to, a toothed rack 66, Fig. 11, with which engages a detent 67, under the influence of a spring 68, the said spring being located, and the detent being slidable, in a barrel 69 fast to the vise frame 46. The detent 67 is provided with an arm 70 extending laterally through a slot in the barrel 69, for enabling the operator to withdraw the detent against the influence of the spring 68, out of engagement with the rack 66. The teeth of the rack 66 and the detent 67 are so shaped as to enable the left-hand knife 49 (through the medium of the hand lever 63) to be moved toward the knife 48, without necessitating the manual withdrawal of the detent out of engagement with the rack, each tooth of the rack, as it is moved downward past the detent during such adjustment, forcing the said detent forward against the influence of the spring 68; the said rack however, positively locks the knife 49 against leftward motion, which motion can be imparted to it only after the detent 67 has been manually disengaged from the rack 66.

If desired the slot along which the arm 70 is movable, may be of L-shaped form to admit of the detent 67, when in its foremost position (and therefore disengaged from the rack 66), being locked in that position by turning it about its axis so as to cause the arm to engage with the tributary part of the said slot, and if desired also, the teeth of the rack 66 may be marked to correspond with the markings on the indicator plate 65, and when so marked, may be used either conjointly with, or in substitution for, the said plate.

The right-hand knife 48, is acted upon by two coiled springs 71 which tend to move it rightward away from the companion knife 49, and it is adapted to be moved leftward by a movable cam bar 72 having one side flat and bearing against the rightmost surface of the said knife, and the other side provided with two inclined cams 73 bearing against studs 74 adjustable in the knife block 75 which, as ordinarily, is secured to the vise frame 46, by bolts and nuts 76.

Each of the springs 71 normally has its two ends in the same vertical plane, as shown best in Fig. 12, its rear end engaging in a recess in the knife 48 and its front end secured in the knife block 75. The knife 48 is yieldingly held against the rear face of the block 75, by means of bolts 77 screwed into the said knife and passing through slots in the knife block, as shown in doted lines in Fig. 9, and through spring washers 78 interposed between the heads of the said bolts and the proximate face of the knife block 75.

The cam bar 72 is operated by a hand lever 79 (Figs. 10 and 12) pivoted to the knife block 75, and with its forked rear end engaging a pin 80 fast to the cam bar. The hand lever 79 also carries an index or pointer 81 working over a plate 82 fast to the knife block 75, this plate bearing indications to indicate the positions to which the lever 79 must be moved, in order to adjust the knife 48 to correspond with the respective adjustments of the before described mold cap 24, for the production of linotypes having respectively different base lines. The cam bar 72 is provided with suitably positioned rack teeth 83, Fig. 10, adapted to be engaged by a detent 84 acted upon by a spring 85, the said spring being contained, and the detent 84 being longitudinally movable, in a barrel 86 fast to the knife block 75. The rack teeth 83 may have markings adjacent to them corresponding with the markings on the indicator plate 82. The spring-pressed detent 84 is provided with a laterally-extending arm 87 capable of being manipulated by the operator similarly to the before described arm 70 and for a like purpose.

Where both of the knives 48 and 49 are adjustable, two flapper plates 88 and 90 are provided, for acting, under the influence of blade springs 91, on the respectively opposite sides of the linotypes. The flapper plate 88 is pivoted, as ordinarily, to the knife block 75 and the flapper plate 90 is similarly pivoted to the vise frame 46, the two springs 91 being secured also to the parts 46 and 75 respectively.

So far as regards the adjustment of the two trimming knives 48, 49 for obtaining variations of body size, it will suffice here to state that when the mold bottom 1 is adjusted, as before described, for obtaining linotypes of a new or variant body size, the lever 63 is operated to secure a corresponding adjustment of the left-hand knife 49, and when the mold cap 24 is adjusted for obtaining linotypes having a new base, the lever 79 is operated to secure a corresponding adjustment of the right-hand knife 48.

In applying the present improvements to machines adapted to produce linotypes having two-line letters, which, according to this invention, aline at foot with the feet of other characters of the line, instead of at head, as has hitherto been the practice, the left-hand knife 49 is endowed with a capacity of vertical adjustment as well as horizontal adjustment. For this purpose the said knife 49 is free to be moved vertically up and down in a slide 92, Figs. 13 and 15, which is free to be adjusted in a horizontal direction on the vise frame 46. This adjustment is given to the slide 92, and through the said slide, to the knife 49, by a vertically movable cam bar 59ª, adapted to act on inclined surfaces 57ª formed on the slide 92, in the same way as the corresponding cam bar 59 is, in the example illustrated in Figs. 9 and 12, caused to act on the back of the left-hand knife 49, this slide 92, in other respects, being actuated in substantially the same manner as is the said knife.

The mechanism for vertically moving the knife 49 may be similar to that described for the same purpose in the specification of either British Letters Patent No. 12213 of 1897 or United States Letters Patent Number 910,489 dated January 26, 1909, in each of which arrangements there is present a lever of the third class acted upon by a cam fast to the cam shaft of the machine, and in the latter of which arrangements this lever is compounded with another lever of the same class and provided with means whereby it may be moved out of operative alinement with the cam to render the knife-moving devices inoperative, as when there are no two-line letters to be produced on the linotypes. In the preferred arrangement according to the present invention and as illustrated in Figs. 16, 17 and 18, the motion is transmitted from the cam 93 to the knife 49, through two connected levers 94, 95 pivoted to suitable fixed parts of the machine frame. The lever 95 is operatively connected with the knife 49 through a bent link 96, and the lever 94, which is connected to it by a pin and slot connection 97, is acted upon by the cam 93 through an anti-friction roller or bowl 98 rotatable on an eccentric stud 99 capable of being rotatably adjusted in an arm 100 which, by a pin 101, Fig. 18, is pivoted to the lever 94 at the end opposite to that at which it (the said lever) is connected to the lever 95. A weight 102 suspended from the lever 94 acts upon the latter antagonistically to the cam 93. The pivoted arm 100 is normally retained in its operative position, in line with the lever 94, by a spring 103 and a stop constituted by its tail 104 which abuts against the said lever 94 as shown in Figs. 16 and 18. The spring 103, at its opposite ends, is attached to pins 105 projecting from the arm 100 and lever 94 respectively. When the arm 100 is held in its normal or operative position by the spring 103 as shown in the drawings, the bowl 98 is in the operative plane of the cam 93, the said arm however, is capable of being moved out of its operative position by means of a wire or equivalent 106 attached to a stud 107 projecting therefrom as shown best in Fig. 18, and which is drawn forward by the operator so as to move the bowl 98 out of the operative plane of the cam 93, when there are no double line letters to be produced on the linotypes. The wire 106 is guided through a stationary eye 108 and, at its forward end, is provided with a peg 109 capable of being inserted in either of two holes 110 according to the required position of the bowl 98.

As previously mentioned, to conform with the requirements of basal alinement, any increase in the thickness of the ejector blade 111, Figs. 16, 19, 20 and 21, as necessitated by variations in the body size of the linotypes to be ejected, must be in a direction toward the center of the mold wheel 4, for which reason the present improvements involve the employment of an ejector mechanism substantially similar to those now used in existing linotype machines, but with certain of the parts thereof reversed. Thus, in the new arrangement, the outer side of the ejector blade 111 (that is to say, the lowermost side in Fig. 19) whatever the thickness of such blade, is always practically in the same vertical plane and is in sliding contact with a fixed guide surface 112, and the inner side, where the variation takes place, works in sliding contact with a spring guide 113. For this purpose any two ejector blades 111, whatever their respective thicknesses elsewhere, are of the same thickness at their rear ends at which they are secured to the ejector slide 113ª, and the said ejector slide is provided with a checked surface which, together with the keeper plate 114 provides a recess or pocket of a size corresponding with that of the said end. The keeper plate 114 is secured to the slide 113ª by screws 115, and the rear end of the ejector blade 111 is retained in the above named pocket by means of pins 116 carried on blade spring 117, which pins enter holes in the said end (as shown in dotted lines in Fig. 19) or in any other of the usual ways. The ejector blade 111 shown in Fig. 19, is one of the thicker ones, but as stated its rear end at which it is secured to the slide 113ª it is of the same thickness as the other blades, at the forward end where it passes between the guides 112 and 113 and through the mold slot 3; this blade is considerably thicker than at its rear end but for some of the thinner linotypes an ejector blade may be used which is of uniform thickness throughout its length as will be well understood.

In respects other than those hereinbefore particularized, the ejector mechanism itself, and the means for operating it, may be of substantially the usual construction.

If desired, the before-described improvements may be embodied in a machine which is capable of producing linotypes with two-line letters overhanging on both sides thereof, for which purpose both of the knives 48, 49 would be longitudinally adjustable, and the before described lever mechanism 94, 95, would be capable of attachment to and detachment from each of such knives.

It is to be understood that the invention is not restricted to the specific construction of apparatus hereinbefore described with reference to the accompanying drawings, as the same is capable of many variations, and modifications without departing from the spirit of the invention.

Throughout this specification the expression "mold cap" is intended to designate that side of the mold nearest the base or foot of the type characters, while the expression "mold bottom" designates that side of the mold nearest the head or upper part of the type characters.
By "the right-hand trimming knife" is meant the knife which dresses the side of the slug nearest the base or foot of the characters, and by "the left-hand knife" is meant the knife which trims the side of the slug nearest the head or top of the characters.

We claim:—

1. In a linotype machine the combination of a mold body, a mold cap attached to said body, a movable mold bottom, a vise frame, a right-hand trimming knife mounted on said vise frame, a laterally adjustable left-hand trimming knife on said vise frame, adjusting means connected with said left-hand knife, and adjusting mechanism in operative relation with said mold bottom to move the latter relatively to said mold body.

2. In a linotype machine the combination of a mold carrier, a mold body fast thereto, a movable mold bottom, a movable mold cap adapted to be adjusted nearer to and farther from the mold body, a vise frame, a right-hand trimming knife mounted on said vise frame, a laterally adjustable left-hand trimming knife on said vise frame, and adjusting mechanism in operative relation with said mold bottom to move the latter relatively to said mold body.

3. In a linotype machine the combination of a mold body, a mold cap in fixed relationship to said body, a movable mold bottom, adjusting mechanism in operative relation with said mold bottom to move the latter relatively to said mold body, a vise frame, a right-hand trimming knife mounted on said vise frame, a laterally adjustable left-hand trimming knife on said vise frame, adjusting means in operative connection with said left-hand knife, an ejector slide, interchangeable blades of respectively different thicknesses, and securing means adapted to attach any one of said blades to said slide in position to conform with the adjustment of said mold bottom.

4. In a linotype machine, the combination of a mold-carrier, a mold body fast thereto, a mold bottom adapted to be moved relatively to the mold body, a mold cap adapted to be adjusted nearer to and farther from the mold body, a vise frame, right-hand trimming knife mounted on the vise frame, left-hand trimming knife also mounted on the vise frame, and means adapted to adjust the said left-hand knife nearer to and farther from the right-hand knife.

5. In a linotype machine, the combination of a mold carrier, a mold body fast thereto, a mold bottom adapted to be moved relatively to the mold body, a mold cap adapted to be adjusted nearer to and farther from the mold body, a vise frame, right-hand trimming knife mounted on the vise frame, left-hand trimming knife also mounted on the vise frame, means adapted to move the left-hand knife downward and upward on the vise frame, an ejector slide, interchangeable ejector blades of respectively different thicknesses, capable of being attached to the ejector slide, the right-hand vertical surfaces of the blades, when so attached and whatever the thickness of such blades, being always situated in the same vertical plane, and means adapted to effect such attachment.

6. In a linotype machine, the combination with a mold body, of a mold bottom adapted to be moved relatively to the mold body and a mold cap adapted to be adjusted nearer to and farther from the mold body.

7. In a linotype machine, the combination of a mold-carrier, a mold body fast thereto, a mold bottom adapted to be moved relatively to the mold body, means adapted to so move the mold bottom, a mold cap adapted to be adjusted nearer to and farther from the mold body, and means adapted to lock the mold bottom and cap in adjusted position.

8. Linotype mold apparatus comprising in combination a mold carrier, a mold cap mounted on said carrier, a movable mold bottom slidably mounted on said carrier, an adjustable cam bar, abutments on said mold bottom in coöperative relation with said cam bar, and means operatively connected with said cam bar to adjust the same with relation to said abutments.

9. Linotype mold apparatus comprising in combination a mold carrier, a mold cap mounted on said carrier, a mold body mounted on said carrier, a movable mold bottom slidably mounted on said mold body, cams on said movable bottom, a slidable cam bar mounted on said carrier in coöperative relation with said cams, a rack on said cam bar, and a pinion revolubly mounted on said carrier and gearing with said rack.

10. Linotype mold apparatus comprising in combination a mold carrier, a mold cap mounted on said carrier, a mold body mounted on said carrier, a movable mold bottom slidably mounted on said mold body, cams on said movable bottom, a slidable cam bar mounted on said carrier in coöperative relation with said cams, springs connected with said mold bottom and said carrier and operative to maintain said relation, a rack on said cam bar, and a pinion revolubly mounted on said carrier and gearing with said rack.

11. In a linotype machine, the combination of a mold body, a mold bottom adapted to be moved relatively to the mold body, an adjustable cam bar in operative connection with the mold bottom and adapted to so move the mold bottom, a guiding surface fast to the mold body, in contact with one side of the cam bar, and an eccentric adapted to engage the other side of such cam bar.

12. In a linotype machine, the combination of a mold body, a mold bottom adapted to be moved relatively to the mold body, an adjustable cam bar in operative connection with, and adapted to so move the mold bottom, and a locking device adapted to secure the cam bar in adjusted position.

13. In a linotype machine, the combination of a mold body, a mold bottom adapted to be moved relatively to the mold body, cam surfaces on the mold bottom, an adjustable cam bar having cams in operative contact with those on the mold bottom, springs adapted to maintain this operative contact, a rack on the cam bar, a pinion rotatable in the mold body, gearing with the said rack, and a locking device adapted to secure the cam bar in adjusted position.

14. In a linotype machine, the combination of a mold body, a mold bottom adapted to be moved relatively to the mold body, lugs on the mold bottom adapted to guide it in such movement, cam surfaces on the lugs, an adjustable cam bar having cams in operative contact with those on the lugs, springs attached to the mold body and mold bottom adapted to maintain the said operative contact, a rack on the cam bar, a pinion rotatable in the mold body and gearing with the said rack, a guiding surface fast to the mold body in contact with one side of the cam bar, and an eccentric adapted to engage the other side of such cam bar.

15. In a linotype machine, the combination of a mold body, a mold bottom adapted to be moved relatively to the mold body, an adjustable cam bar in operative connection with, and adapted to so move the mold bottom, springs attached to the mold body and mold bottom, adapted to maintain the said operative contact, a rack on the cam bar, a pinion rotatable in the mold body and gearing with the said rack, a locking device adapted to lock the cam bar in adjusted position, a mold cap adjustable relatively to the mold body, and liners adapted to fit between the adjustable mold bottom and adjustable cap.

16. Linotype mold apparatus comprising in combination a mold carrier, a mold body mounted thereon, a mold cap, adjustable fixing means securing said cap to said carrier and permitting of the relation of said cap to said body to be readily changed, openings in the said mold cap, openings in said mold carrier so disposed as to be variably overlapped by the first named openings according to the degree of adjustment of said cap, and liners of a thickness corresponding to the overlapping portions of said openings and adapted to fit therein to maintain the adjustment.

17. Linotype mold apparatus comprising in combination a mold carrier, a mold body fast thereto, a mold bottom adjustably mounted on said mold body, a mold cap, adjustable fixing means securing said cap to said carrier and permitting of the relation of said cap to said body to be readily changed, openings in the said mold cap, openings in the said mold carrier so disposed as to be variably overlapped by the first named openings according to the degree of adjustment of said cap, and liners of a thickness corresponding to the overlapping portions of said openings and adapted to fit therein to maintain the adjustment.

18. In a linotype machine, the combination of a mold carrier, a mold body fast thereto, a mold bottom adapted to be moved relatively to the mold body, means adapted to so move the mold bottom, a mold cap adapted to be adjusted nearer to and farther from the mold body, openings in the mold cap and mold carrier and liners adapted to fit into the said openings for defining the position of the mold cap relatively to the mold body.

19. In a linotype machine, the combination of a mold carrier, a mold body fast thereto, a mold bottom adapted to be moved relatively to the mold body, a mold cap adapted to be adjusted nearer to and farther from the mold body, openings in the mold cap and mold carrier, liners adapted to fit into the said openings for defining the position of the mold cap relatively to the mold body and liners adapted to fit between the adjustable mold bottom and adjustable cap for defining the relative positions of these two parts.

20. In a linotype machine, the combination of a mold carrier, a mold body fast thereon a mold bottom adapted to be moved relatively to the mold body, means adapted to so move the mold bottom, a mold cap adapted to be adjusted nearer to and farther from the mold body, openings in the mold cap and mold carrier, liners adapted to fit into the said openings for defining the position of the mold cap relatively to the mold body, and liners adapted to fit between the adjustable mold bottom and adjustable cap for defining the relative positions of these two parts.

21. In a linotype machine, the combination of a mold carrier, a mold body fast thereto, a mold bottom adapted to be moved relatively to the mold body, an adjustable cam bar in operative contact with the mold bottom and adapted to so move it, means adapted to adjust the cam bar, a mold cap adapted to be adjusted nearer to and farther from the mold body, openings in the mold cap and mold carrier, liners adapted to fit into the said openings for defining the position of the mold cap relatively to the mold body, and liners adapted to fit between the adjustable mold bottom and adjustable cap for defining the relative positions of these two parts.

22. In a linotype machine, the combination of a mold carrier, a mold body fast thereto, a mold bottom adapted to be moved relatively to the mold body, an adjustable cam bar in operative contact with the mold bottom and adapted to so move it, a rack on the cam bar, a pinion rotatable in the mold body, gearing with the said rack, a locking device adapted to secure the cam bar in adjusted position, a mold cap adapted to be adjusted nearer to and farther from the mold body, openings in the mold cap and mold carrier, liners adapted to fit into the said openings for defining the position of the mold cap relatively to the mold body, and liners adapted to fit between the adjustable mold bottom and adjustable cap for defining the relative positions of these two parts.

23. In a linotype machine, the combination of a mold carrier, a mold body fast thereto, a mold bottom adapted to be moved relatively to the mold body, an adjustable cam bar in operative contact with the mold bottom and adapted to so move it, a rack on the cam bar, a pinion rotatable in the mold body, gearing with the said rack, a guiding surface fast to the mold body, in contact with one side of the cam bar, an eccentric adapted to engage the other side of such cam bar, holes in the pinion and eccentric adapted to receive a key whereby they may be rotated, a mold cap adapted to be adjusted nearer to and farther from the mold body, openings in the mold cap and mold carrier, liners adapted to fit into the said openings for defining the position of the mold cap relatively to the mold body, and liners adapted to fit between the adjustable mold bottom and adjustable cap for defining the relative positions of these two parts.

24. In a linotype machine, the combination of a mold carrier, a mold body fast thereto, a mold bottom adapted to be moved relatively to the mold body, cam surfaces on the mold bottom, an adjustable bar in operative contact with the cam on the mold bottom, springs adapted to maintain this operative contact, a rack on the adjustable bar, a pinion gearing with the said rack, a guiding surface fast to the mold body, in contact with one side of the adjustable bar, an eccentric adapted to engage the other side of such bar, holes in the pinion and eccentric adapted to receive a key whereby they may be rotated, a mold cap adapted to be adjusted nearer to and farther from the mold body, openings in the mold cap and mold carrier, liners adapted to fit into the said openings for defining the position of the mold cap relatively to the mold body, and liners adapted to fit between the adjustable mold bottom and adjustable cap for defining the relative positions of these two parts.

25. In a linotype machine, the combination of a vise frame, a right-hand trimming knife movably mounted upon said vise frame, adjusting mechanism embodying a hand lever, operative upon said knife, a left-hand trimming knife movably mounted upon said vise frame, adjusting mechanism embodying a hand lever operative upon said left-hand knife, both of the said hand levers being situated conveniently for operation by the operator at the front of the machine and each of said mechanisms independently of the other one being adapted to move its respective knife approximately or divorcively with relation to the other knife.

26. In a linotype machine, the combination of a vise frame, a right-hand trimming knife movably mounted upon said vise frame, a left-hand trimming knife movably mounted on said vise frame, means constantly tending to move said left-hand knife leftward, a slider operatively connected with said knife and adapted to move the same in opposition to said means, and a one-way locking device operative upon said slider to lock same against movement productive of leftward adjustment of said left-hand knife but to leave said slider free to be moved in the direction productive of rightward adjustment of said left-hand knife.

27. In a linotype machine, the combination of a vise frame, a right-hand trimming knife mounted on the vise frame, a left-hand trimming knife movably mounted on the vise frame, means constantly tending to move the left-hand knife leftward, a slider operatively connected with said left-hand knife and adapted to move the same in opposition to said means, a lateral adjustment operative upon said slider to adjust the latter toward and from said knife, and means adapted to give said slider sliding movement to adjust said knife.

28. In a linotype machine the combination of a vise frame, a right-hand trimming knife mounted on the vise frame, a left-hand trimming knife movably mounted on the vise frame, means constantly tending to move the left-hand knife away from the right-hand knife, a cam bar slidable in parallel relation to said knife and operative to move said knife in opposition to said means, means adapted to slide said cam bar, and adjusting means adapted to laterally adjust said cam bar toward or from said left-hand knife.

29. In a linotype machine the combination of a vise frame, a right-hand trimming knife mounted on the vise frame, a left-hand trimming knife movably mounted on the vise frame, means constantly tending to move the left-hand knife away from the right-hand knife, cams on this left-hand knife, a cam bar slidable in parallel relation to said left-hand knife with its cams in coöperative engagement with the cams on said knife, means adapted to slide said cam bar, and adjusting means adapted to laterally adjust said cam bar toward or from said left-hand knife.

30. In a linotype machine, the combination of a vise frame, a right-hand trimming knife mounted on said vise frame, a left-hand trimming knife adjustably held to the vise frame, guides on said left-hand knife, guides on said vise frame coöperating with the guides on said left-hand knife to restrict said knife to lateral movements, springs operatively connected with said left-hand knife to move the left-hand knife away from the right-hand one, and a cam bar slidable in parallel relation to said left-hand knife and in operative connection therewith to move said knife in opposition to said means.

31. In a linotype machine, the combination of a vise frame, a right-hand trimming knife movably mounted on said vise frame, a left-hand trimming knife movably mounted on said vise frame, constantly operative means engaging each of said knives and tending to move them divorcively, a slidable cam bar in operative engagement with each knife to move it in opposition to said means, and an adjustment for each of said bars operative to adjust the respective bar toward or from the corresponding knife.

32. In a linotype machine, the combination of a vise frame, a right-hand trimming knife movably mounted on said vise frame, a left-hand trimming knife movably mounted on said vise frame, constantly operative means engaging each of said knives and tending to move them divorcively, a slidable bar in operative engagement with each knife to move it in opposition to said means, an adjustment for each of said bars operative to adjust the respective bar toward or from the corresponding knife, and locking devices operative upon the bars and adapted to lock said knives against divorcive movement.

33. In a linotype machine, the combination of a vise frame, a right-hand trimming knife movably mounted on said vise frame, a left-hand trimming knife movably mounted on said vise frame, constantly operative means engaging each of said knives and tending to move them divorcively, a slidable cam bar for each knife with its cams in operative relation with the respective knife to move the knife in opposition to said means, an adjustment for each of said bars operative to adjust the respective bar toward or from the corresponding knife, and locking devices operative upon the cam bars in such manner as to lock said knives against divorcive movement.

34. In a linotype machine the combination of a vise frame, a right-hand trimming knife movably mounted on said vise frame, a left-hand trimming knife movably mounted on said vise frame, constantly operative means engaging said left-hand knife and tending to move it away from the right-hand one, a slidable cam bar for the left-hand knife in operative relation with such knife to move it in opposition to said means, an adjustment for said cam bar operative to adjust the bar toward or from the left-hand knife, a hand lever operatively connected with the cam bar for sliding it, a scale in indicative relation with said lever, and a locking device operative upon the cam bar in such manner as to lock the left-hand knife against movement away from the right hand knife.

35. In a linotype machine the combination of a vise frame, a right-hand trimming knife movably mounted on said vise frame, a left-hand trimming knife movably mounted on said vise frame, constantly operative means engaging each of said knives and tending to move them divorcively, a slidable cam bar the cams of the respective bars being in operative relation with the corresponding knives to move the knives in opposition to said means, an adjustment for each of said cam bars operative to adjust the respective bar toward or from the corresponding knife, a hand lever operatively connected with each cam bar for sliding it, a scale in indicative relation with each hand lever, and a locking device operative upon each cam bar in such manner as to lock the knives against divorcive movement.

36. The combination with linotype mold apparatus productive of linotypes with characters of diverse depths thereon basally alined, of trimming knives and means for adjusting longitudinally the knife which is adapted to trim that face of the type bar adjacent the unalined heads.

37. The combination with linotype mold apparatus productive of linotypes with characters of diverse depths thereon basally alined, of trimming knives, means for adjusting longitudinally the knife which is adapted to trim that face of the type bar adjacent the unalined heads, and means for adjusting this knife toward or from its companion knife.

38. The combination with linotype mold apparatus productive of linotypes with characters of diverse depths thereon basally alined, of trimming knives, means for adjusting longitudinally the knife which is adapted to trim that face of the type bar adjacent the unalined heads, constantly operative means tending to move this knife away from its companion knife, and an adjustment for moving this knife in opposition to said constantly operative means.

39. The combination with linotype mold apparatus productive of linotypes with characters of diverse depths thereon basally alined, of trimming knives, means for adjusting longitudinally the knife which is adapted to trim that face of the type bar adjacent the unalined heads, constantly operative means tending to move this knife away from its companion knife, an adjustment for moving this knife in opposition to said constantly operative means, and a locking device adapted to lock the knife against the action of said constantly operative means.

40. The combination with linotype mold apparatus productive of linotypes with characters of diverse depths thereon basally alined, of trimming knives, means for adjusting longitudinally the knife which is adapted to trim that face of the type bar adjacent the unalined heads, constantly operative means tending to move this knife away from its companion knife, cams on this knife, and a slider for engaging said cams to move this knife in opposition to said constantly operative means.

41. The combination with linotype mold apparatus productive of linotypes with characters of diverse depths thereon basally alined, of trimming knives, means for adjusting longitudinally the knife which is adapted to trim that face of the type bar adjacent the unalined heads, constantly operative means tending to move this knife away from its companion knife, and a slidable cam bar in operative relation with this knife to move it in opposition to said constantly operative means.

42. The combination with linotype mold apparatus productive of linotypes with characters of diverse depths thereon basally alined, of trimming knives, a laterally adjustable guide on the vise frame for the reception of the knife which is adapted to trim that face of the type bar adjacent the unalined heads, means adapted to reciprocate this knife in the guide, constantly operative means tending to move this guide and contained knife away from the companion knife, cams on the guide, and a slider for engaging said cams to move said guide and contained knife in opposition to said constantly operative means.

43. The combination with linotype mold apparatus productive of linotypes with characters of divers depths thereon basally alined of trimming knives, a laterally adjustable guide on the vise frame for the reception of the knife which is adapted to trim that face of the type bar adjacent the unalined heads, means slidably securing the other knife to the vise frame, means adapted to reciprocate the knife in the guide, constantly operative means tending to move the knives divorcively, and an adjustment for each of the knives for moving them in opposition to said constantly operative means.

44. The combination with linotype mold apparatus productive of linotypes with characters of diverse depths thereon basally alined, of trimming knives, a laterally adjustable guide on the vise frame for the reception of the knife which is adapted to trim that face of the type bar adjacent the unalined heads, means adapted to reciprocate this knife in the guide, constantly operative means tending to move this guide and contained knife away from the companion knife, and a sliding cam bar in operative relation with said guide to adjust it in opposition to said constantly operative means.

45. The combination with linotype mold apparatus productive of linotypes with characters of diverse depths thereon basally alined, of a vise frame, trimming knives laterally adjustable on said vise frame, constantly operative means tending to move the knives divorcively, a slidable bar for each knife operative to move the respective knife toward its companion knife, and means for adjusting longitudinally the knife which is adapted to trim that face of the type bar adjacent the unalined heads.

46. The combination with linotype mold apparatus productive of linotypes with characters of diverse depths thereon basally alined, of a vise frame, trimming knives laterally adjustable on said vise frame, constantly operative means tending to move the knives divorcively, a slidable bar for each knife operative to move the respective knife toward the companion knife, means for adjusting longitudinally the knife which is adapted to trim that face of the type bar adjacent the unalined heads, and locking means adapted to lock the knives against divorcive movement.

47. The combination with linotype mold apparatus productive of linotypes with characters of diverse depths thereon basally alined, of a vise frame, trimming knives laterally adjustable on said vise frame, constantly operative means tending to move the knives divorcively, an adjustable sliding cam bar for each knife operative to move the respective knife toward the companion knife, locking means adapted to lock the knives against divorcive movement, and means for adjusting longitudinally the knife which is adapted to trim that face of the type bar adjacent the unalined heads.

48. The combination with linotype mold apparatus productive of linotypes with characters of diverse depths thereon basally alined of a vise frame, trimming knives laterally adjustable on said vise frames, a spring constantly tending to move away from its companion the knife which is adapted to trim that face of the type bar adjacent the unalined heads, an adjustable cam bar adapted to move this knife in opposition to said spring, a hand lever operatively connected with the cam bar for effecting this adjustment, a scale in indicative relation with said hand lever, a locking device operative upon said cam bar to lock the corresponding knife against movement away from the other knife, and means adapted to adjust longitudinally the normally locked knife.

49. The combination with linotype mold apparatus productive of linotypes with characters of diverse depths thereon basally alined, of a vise frame, a laterally adjustable knife guide on the vise frame, a trimming knife in said guide, said knife being adapted to trim that face of the type bar adjacent the unalined heads, a companion knife adjustably mounted on the vise frame, springs tending to move the last named knife and said guide divorcively slidable cam bars adapted to adjust the guide with its knife and the companion knife in opposition to said springs, a hand lever operatively connected with each cam bar for effecting its longitudinal adjustment, a scale in indicative relation with each of said levers, locking devices operative upon said cam bars to lock the respective knife and said guide against the action of said springs, and an adjustment adapted to move the first named knife in its guide.

50. In linotype mold apparatus productive of linotypes with characters of diverse depths thereon basally alined and in combination with ejector blade mechanism adjustable as to the thickness of the blades in the direction of the bases of the type bars, a fixed guide for those surfaces of the blades on the same side as the heads of the characters of the type bars, and an opposed movable guide adjustable toward and from said fixed guide.

51. The combination with linotype mold apparatus productive of linotypes with characters of diverse depths thereon basally alined, of an ejector blade, a fixed guide for that surface of said blade corresponding with the surfaces of type bars adjacent the unalined heads of characters thereon, and a yielding guide for that surface of said blade corresponding with the surfaces of type bars adjacent the alined bases of characters thereon.

52. In a linotype machine, the combination with a linotype trimming knife adapted to be moved in a direction parallel with its cutting edge, a lever operatively connected with the knife for so moving it, an arm pivoted to the lever, a roller on the arm, normally in the path of a rotating cam, a spring adapted to hold the roller in the said path, a manually controllable device adapted to turn the arm on its pivot to remove the roller from the path of the cam, and devices adapted to retain the roller out of the said path.

53. In a linotype machine a mold wheel and a slotted mold having a permanent inner wall and means for adjusting the same toward and from the center of the wheel, in combination with a left-hand slug trimming knife, adjustable to correspond with the adjustment of the mold wall, whereby the machine is adapted for the use of matrices having characters of different font sizes with a common alinement at the base of the characters.

54. In a linotype machine the combination of a mold wheel and a slotted mold secured thereto, said mold having permanent inner and outer walls independently adjustable toward and from the center of the wheel.

55. In a linotype machine a mold wheel and a slotted mold secured thereto, said mold having a ledge to engage and aline the matrices and having permanent its outer and inner walls independently adjustable toward and from the center of the wheel.

In witness whereof we have hereunto set our hands in the presence of two witnesses.

HERBERT PEARCE.
JOHN ERNEST BILLINGTON.

Witnesses:
J. ARNOLD HANCOCK,
THOMAS A. ANDREWS.